(12) United States Patent
Padavala et al.

(10) Patent No.: US 11,082,339 B2
(45) Date of Patent: Aug. 3, 2021

(54) DOMAIN NAME SYSTEM (DNS) OPTIMIZATION FOR WIDE AREA NETWORKS

(71) Applicant: HEWLETT PACKARD ENTERPRISE DEVELOPMENT LP, Houston, TX (US)

(72) Inventors: Sujeeth Padavala, Karnataka (IN); Isaac Theogaraj, Karnataka (IN); Amit Pingale, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 110 days.

(21) Appl. No.: 16/158,893

(22) Filed: Oct. 12, 2018

(65) Prior Publication Data
US 2020/0120024 A1    Apr. 16, 2020

(51) Int. Cl.
| G06F 15/16 | (2006.01) |
| H04L 12/721 | (2013.01) |
| H04L 29/12 | (2006.01) |
| H04L 29/06 | (2006.01) |
| H04L 12/841 | (2013.01) |
| H04L 12/803 | (2013.01) |
| H04L 12/727 | (2013.01) |

(52) U.S. Cl.
CPC ............ *H04L 45/72* (2013.01); *H04L 45/121* (2013.01); *H04L 47/125* (2013.01); *H04L 47/283* (2013.01); *H04L 61/1511* (2013.01); *H04L 63/029* (2013.01)

(58) Field of Classification Search
CPC ......... H04L 67/18; H04L 29/06; H04L 29/12; H04L 29/16; H04L 63/1425; H04L 63/1433; H04L 63/20

USPC .......................... 709/203, 217, 219, 228, 245
See application file for complete search history.

(56) References Cited

U.S. PATENT DOCUMENTS

| 7,082,476 B1 * | 7/2006 | Cohen ............... H04L 29/12009 709/246 |
| 9,087,319 B2 | 7/2015 | Nguyen |
| 9,935,955 B2 | 4/2018 | Desai et al. |
| 2008/0086574 A1 * | 4/2008 | Raciborski .......... H04L 61/1511 709/245 |

(Continued)

OTHER PUBLICATIONS

A Comparison of DNS Server Types: How to Choose the Right DNS Configuration, Jul. 1, 2014, pp. 1-14 Retried from the Internet on Aug. 23, 2018 URL: <digitalocean.com/community/tutorials/a-comparison-of-dns-server-types-how-to-choose-the-right-dns-configuration>.

(Continued)

*Primary Examiner* — Farzana B Huq
(74) *Attorney, Agent, or Firm* — McDermott Will & Emery

(57) ABSTRACT

A method including receiving, in a controller, from a client device in a network, a resolution query specifying a host name, is provided. The method includes parsing the resolution query to determine whether the host name is associated with an core host or with a public host, and directing the resolution query to a remote domain name system server dedicated to service the core host when the host name is associated with an enterprise name. The method also includes directing the resolution query to a local domain name system server when the host name is associated with a public service provided by the public host. A system to perform the above method is also provided.

7 Claims, 7 Drawing Sheets

(56) References Cited

U.S. PATENT DOCUMENTS

2011/0153867 A1\* 6/2011 van de Ven ............. H04L 67/02
  709/245
2018/0103007 A1\* 4/2018 Vilenski .............. H04L 61/2053
2018/0278570 A1\* 9/2018 Dhanabalan ........ H04L 61/2007

OTHER PUBLICATIONS

Alvarez, A.E., DNS Forwarding and Conditional Forwarding, Mar. 10, 2010, pp. 1-18, Retrieved from the Internet on Aug. 23, 2018 URL: <medium.com/tech-jobs-academy/dns-forwarding-and-conditional-forwarding-f3118bc93984>.

Wikipedia, "Talk:Dnsmasq", available online at <https://web.archive.org/web/20180908052050/https://wiki.archlinux.org/index.php/Dnsmasq>, Sep. 8, 2018, 3 pages.

Petri, D., Best Practices for DNS Forwarding, Jul. 17, 2014 pp. 1-5, Retried from the Internet on Aug. 23, 2018 URL: <petri.com/best-practices-for-dns-forwarding>.

Cisco; Split DNS, Jun. 1, 2017, pp. 1-38, Retrieved from the Internet on Aug. 23, 2018 URL: <cisco.com/c/en/us/td/docs/ios-xml/ios/ipaddr_dns/configuration/15-mt/dns-15-mt-book/dns-spl-dns.pdf>.

\* cited by examiner

DOMAIN NAME SYSTEM (DNS) OPTIMIZATION FOR WIDE AREA NETWORKS

BACKGROUND

A critical task in centralized network engineering is to handle lag in host name resolution (e.g., domain name to universal resource locator (URL) address link). For centralized systems where the main domain name system (DNS) server is remotely located (e.g., across continents), host name resolution may cause exceedingly long latencies (e.g., 2 seconds, or more). One approach to address this problem includes installing multiple DNS servers or Load Balancing devices, e.g., Application Delivery Controllers (ADC) to handle the resolution queries. However, this approach involves infrastructure overhead, thereby incurring in significant increase to installation and maintenance costs.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
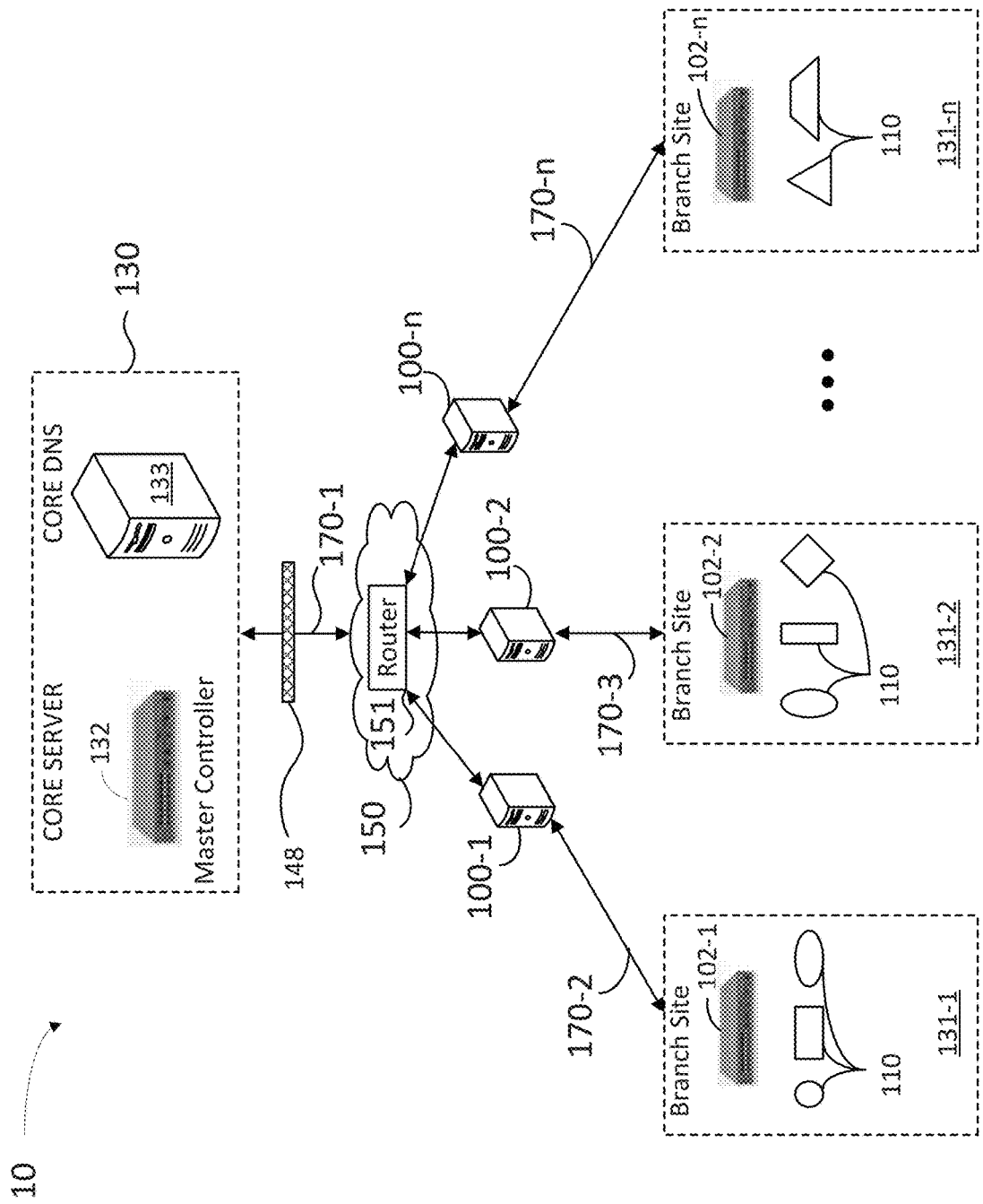
FIG. 1 is an architecture illustrating an example network suitable for separating DNS traffic into corporate/intranet traffic and general/internet traffic using multiple DNS servers, according to certain aspects of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Embodiments as disclosed herein provide network controller devices that can be configured to respond to network events and deployment updates. A network manager or administrator may re-configure devices and systems as disclosed herein according to different, custom needs arising in any given location. For example, embodiments as disclosed herein provide on-the-fly customization of network controllers to reduce latency of host name resolution.

In a centralized network configuration, a master controller located in a corporate server determines the configuration of network controllers and other devices further down the network hierarchy. In many instances, the master controller has a corporate DNS server address configured to handle host name resolution throughout the network. In some embodiments, a network architecture includes multiple slave controllers at branch sites, e.g., branch office controllers (BoCs). In such situations, hostname resolution may run the risk of slowing down a particular server dedicated to the branch site due to multiple queries received from various client devices attempting connection to the BoC. These extended latencies may induce the implementation of traffic load-balancing strategies to address bandwidth congestion and server over-load. For example, in some configurations a query resolution may have a latency of 2 seconds or more when multiple BoCs handle multiple client devices.

Embodiments as disclosed herein solve the above problem arising in computer network technology by configuring a BoC to select which DNS server to query for URL/domain name resolution, based on the query. In addition, by parsing a domain name resolution query a BoC as disclosed herein may differentiate between corporate and general traffic, and direct the queries to different DNS servers. This approach also provides enhanced security for the corporate traffic, as the corporate DNS server may be protected by a firewall.

Embodiments as disclosed herein include the technical solution of a BoC configuration application including a command-line interface (CLI). Through the CLI, a network administrator may input network domains for which the traffic is redirected to a dedicated DNS server (e.g., an enterprise query is directed to a corporate DNS server). Accordingly, embodiments as disclosed herein enable a network administrator to routinely, or at any desired time, re-configure the BoC through the CLI in the configuration application and include new, different, or updated network domain names. Some embodiments also include the ability to delete or remove obsolete domain names from the BoC configuration.

In one embodiment of the present disclosure, a computer-implemented method is described that includes receiving, in a controller, from a client device in a network, a resolution query specifying a host name. The computer-implemented method includes parsing the resolution query to determine whether the host name is associated with an core host or with a public host, and directing the resolution query to a remote domain name system server dedicated to service the core host when the host name is associated with an enterprise name. The computer-implemented method also includes directing the resolution query to a local domain name system server when the host name is associated with a public service provided by the public host.

According to one embodiment, a system is described that includes a memory storing instructions and one or more processors configured to execute the instructions to receive, in a controller, from a client device in a network, a resolution query specifying a host name and to parse the resolution query to determine whether the host name is associated with an core host or with a public host. The one or more processors are also configured to direct the resolution query to a remote domain system server dedicated to service the core host when the host name is associated with an enterprise name, and to direct the resolution query to a local domain name system server when the host name is associated with a public service provided by the public host.

According to one embodiment, a non-transitory, machine-readable medium is described that includes instructions, which when executed by one or more processors, cause a computer to perform a method, the method including receiving, in a controller, from a client device in a network, a resolution query specifying a host name. The method also includes parsing the resolution query to determine whether the host name is associated with an core host or with a public host, and directing the resolution query to a remote domain name system server dedicated to service the core host when the host name is associated with an enterprise name. The method also includes directing the resolution query to a local domain name system server when the host name is associated with a public service provided by the public host.

In yet other embodiment, a system is described that includes a means for storing commands and a means for executing the commands causing the system to perform a method that includes receiving, in a controller, from a client device in a network, a resolution query specifying a host name. The method also includes parsing the resolution query to determine whether the host name is associated with an core host or with a public host, and directing the resolution query to a remote domain name system server dedicated to service the core host when the host name is associated with an enterprise name. The method also includes directing the resolution query to a local domain name system server when the host name is associated with a public service provided by the public host.

In one embodiment, a computer-implemented method as disclosed herein includes selecting a host name associated with an enterprise service provided by a remote server communicatively coupled with a remote domain name system server. The computer-implemented method also includes configuring a controller in a local domain name server, through a command line interface, to re-direct a host name resolution query from a client device to the remote domain name system server.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example network architecture 10 suitable for separating DNS traffic into corporate/intranet traffic and general/internet traffic using multiple DNS servers, according to certain aspects of the disclosure. Network architecture 10 offers centralized network engineering, IP services, security and policy controls, and app-aware platforms through a core server 130. In some embodiments, network architecture 10 is a wide area network provided by an enterprise or corporation, and core server 130 is a corporate server that belongs to the enterprise (e.g., a service provider, a business, an industry, or a chain franchise such as a restaurant, hotel, and the like). Core server 130 includes a master controller 132 and a core DNS server 133. A router 151 in a network 150 distributes services from core server 130 to multiple branch sites 131-1, 131-2, and 131-n (hereinafter, collectively referred to as "branch sites 131"), where 'n' can be any integer number. Each one of branch sites 131 may be serviced by a local DNS server 100-1, 100-2, and 100-n (hereinafter, collectively referred to as "local DNS servers 100"), respectively. Further, each one of branch sites 131 may include a BoC 102-1, 102-2, through 102-n (hereinafter, collectively referred to as "BoCs 102"), respectively. In addition to network control within branch sites 131, BoCs 102 and master controller 132 may be deployed as branch gateways, VPN concentrators, Wireless Intrusion Detection System/Wireless Intrusion Prevention System and spectrum monitors, including stateful network firewalls with integrated content filtering. In some embodiments, network architecture 10 may span a wide range of geo-locations, including multiple continents.

Many distributed enterprises with branch and remote office locations use BoCs 102 as a cost-effective hybrid WAN connectivity solution. In some embodiments, BoCs 102 may operate in the context of includes low-cost DSL, 4G and LTE technologies, rather than relying solely on traditional T1/E1 or T3/E3 dedicated circuits. In some embodiments, network architecture 10 follows a master-slave model of configuration where the BoCs 102 receive a configuration from master controller 132. Accordingly, in a startup configuration, the IP address of core DNS server 133 may be set as default. Embodiments consistent with the present disclosure provide a reconfigurable option for BoCs 102 to avoid having core DNS server 133 perform all DNS query resolution. This reduces the load and delay time for query resolution at branch sites 131, enabling network growth. In some embodiments, BoCs 102 may be configured and deployed similarly to an access point in a local area network (LAN). Embodiments as disclosed herein may use a single-point configuration to adaptively reconfigure BoCs 102 to redirect domain name queries to local DNS servers 100 or to corporate DNS 101.

Network connectivity may be provided through encapsulated, secure links 170-1, 170-2, 170-3 through 170-n (hereinafter, collectively referred to as "tunnels 170"). A firewall 148 may protect core server 130 from public traffic in network 150. Data accessing router 151 through network 150 from branch sites 131 may be unencrypted, and data accessing core server 130 may be encrypted through firewall 148.

Core server 130, core DNS server 133, master controller 132, local DNS servers 100, BoCs 102 and client devices 110 include memory circuits storing instructions which, when executed by one or more processors, cause the devices to perform at least some of the steps in methods as disclosed herein. Network 150 can include, for example, any one or more of a wide area network (WAN), the Internet, and the like. Further, network 150 and branch sites 131 can include, but are not limited to, any one or more of the following network topologies, including a bus network, a star network, a ring network, a mesh network, a star-bus network, tree or hierarchical network, and the like.

Figure 2:
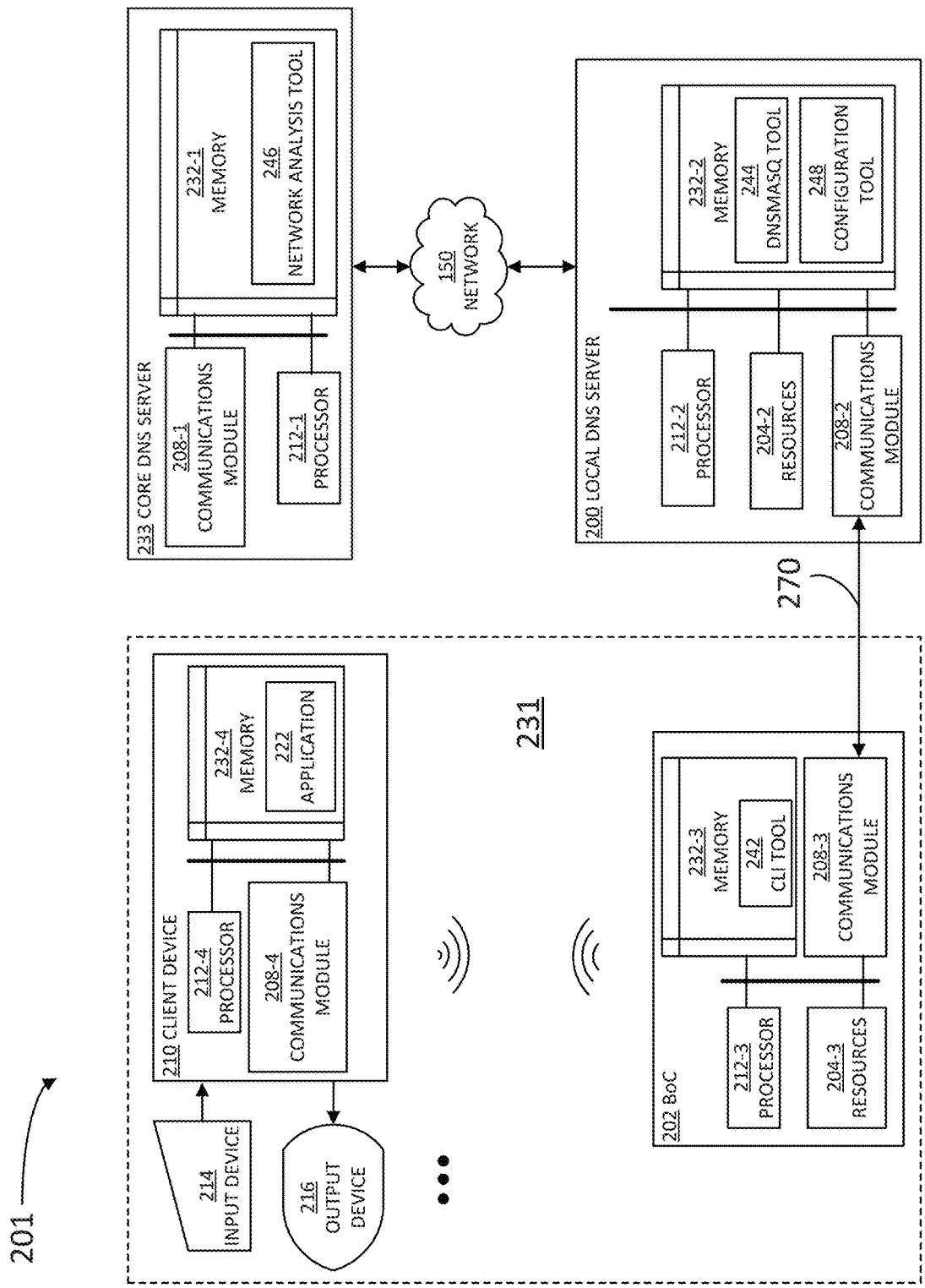
FIG. 2 is an architecture illustrating an example client device and branch office controller in a branch site, a local DNS server, and a corporate DNS server from the architecture of FIG. 1, according to some embodiments.

FIG. 2 is an architecture 201 illustrating an example client device 210 and BoC 202 in a branch site 231, a local DNS server 200, and a core DNS server 233 from the architecture of FIG. 1, according to some embodiments. Corporate server 230 includes a communications module 208-1, a processor 212-1, and a memory 232-1. Memory 232-1 may include a network analysis tool 246. Network analysis tool 246 may configured to perform data analytics on the packets received from and transmitted to, branch site 231 within network architecture 201.

Local DNS server 200 includes a communications module 208-2, a processor 212-2, resources 204-2 and a memory 232-2. Memory 232-2 may include a DNSMASQ tool 244 and a configuration tool 248. Configuration tool 248 include a list of settings and scripts including configuration settings and communication protocols for multiple connectivity modes between client device 210 and BoC 202. Accordingly, when client device 210 is de-configured, or at least one connectivity mode in client device 210 is disabled, erased, or reset (e.g., by error, damage, or a malicious attack), local DNS server 200 may provide a fresh copy of the missing configuration script to client device 210 from configuration tool 248, directly through network 150, or through BoC 202. In some embodiments, configuration tool 248 may include source tools such as NSLOOKUP and DIG to retrieve metrics for the network traffic through tunnel 270. A DNSMASQ tool 244 may include configuration options for BoC 202. Accordingly, DNSMASQ tool 244 may include a dnsmasq script coded for small embedded systems. In some embodiments, DNSMASQ tool 244 enables a small memory footprint compatible with supported functions, and allows unnecessary functions to be omitted from the compiled binary in memory 232-3.

BoC 202 may be communicatively coupled with local DNS server 200 via a tunnel 270 (cf. tunnels 170). BoC includes a processor 212-3, a memory 232-3, a communications module 208-3, and resources 204-3. Memory 232-3 may also include a CLI tool 242. In some embodiments, CLI tool 242 is configured to receive commands from a network administrator reconfiguring BoC 202 based on a desired update (e.g., providing a new domain name or an IP address for a new or different corporate DNS server, or local DNS server). In some embodiments, CLI tool 242 may be installed in BoC 202 by core DNS server 233 or by local DNS server 200, and perform scripts and other routines provided by core DNS server 233.

Client device 210 includes processor 212-4, communications module 208-4, and memory 232-4. Memory 232-4 may further include an application 222, e.g., an application hosted by core DNS server 233 (cf. core server 130) or a public server in network 150. Client device 210 may also be coupled with an input device 214 and an output device 216. Input device 214 may include a mouse, a keyboard, a touchscreen, and the like. Output device 216 may include a display, a touchscreen, a microphone, and the like. In some embodiments, input device 214 and output device 216 may be included in the same unit (e.g., a touchscreen).

Resources 204-3 and 204-4 will be collectively referred to, hereinafter, as "resources 204." Resources 204 enable BoC 202 to handle networking operations within a branch office, such as Wi-Fi, Bluetooth and the like, provided by BoC 202 within branch site 231. Resources 204 may include hardware and software components, such as radio frequency (RF) antennas and controller circuits to scan branch site 231 and look for client devices 210 present therein (e.g., using a BLE radio), and the like. Communications modules 208-1, 208-2, 208-3 and 208-4 will be collectively referred to, hereinafter, as "communications modules 208." Communication modules 208 may include a wireless communication antenna so that client device 210 may locally interact with BoC 202, or on a device-to-device handshake basis. In some embodiments, BoC 202 may include an AP or an IAP hosted by core DNS server 233 and servicing branch site 231. Communications modules 208 are configured to interface with network 150 to send and receive information, such as data, requests, responses, and commands to other devices on the network. Communications modules 208 include, for example, modems or Ethernet cards.

Figure 3:
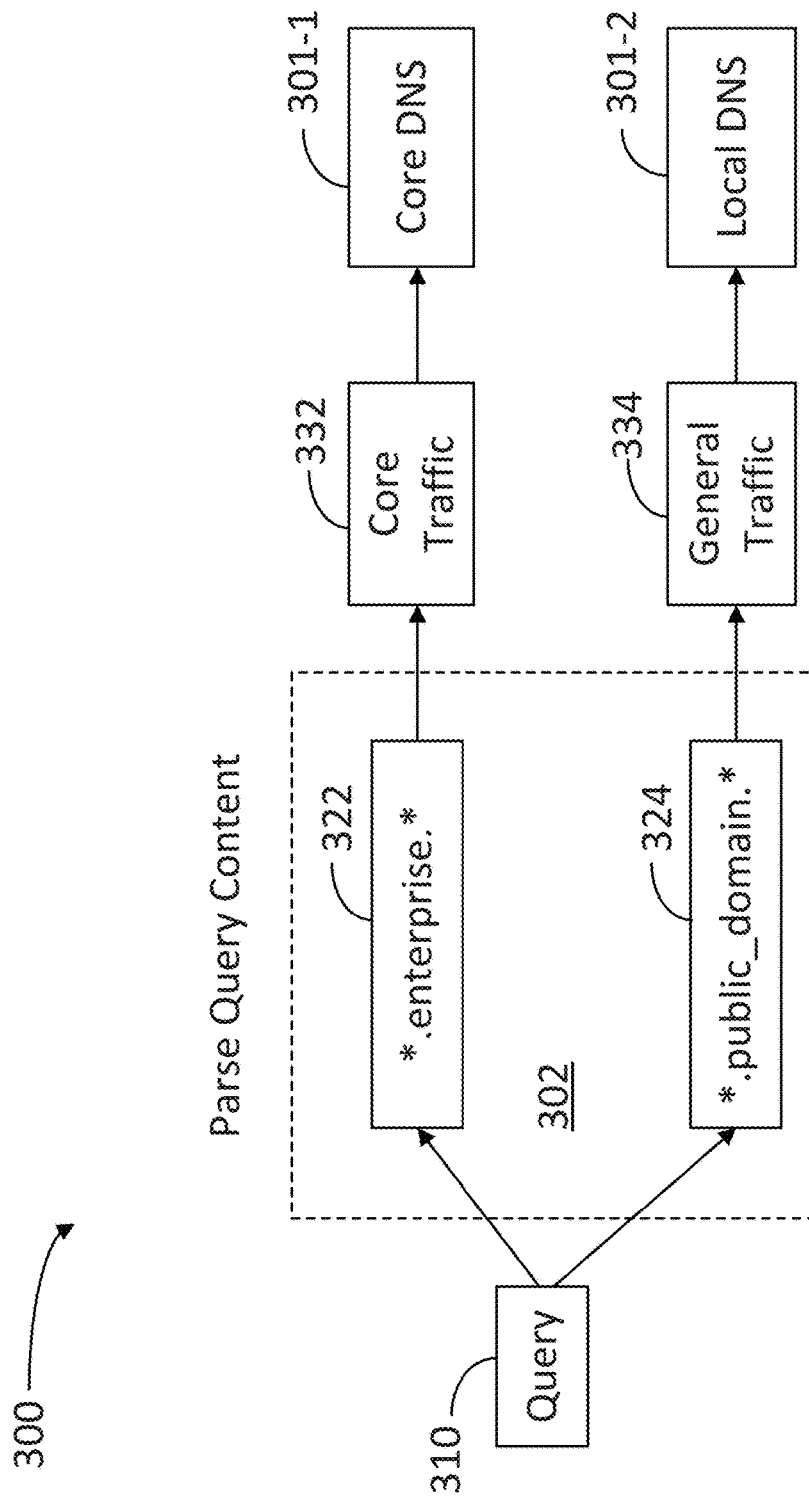
FIG. 3 is a block diagram of a system for re-directing a domain name query to an enterprise DNS server or a local DNS server, according to some embodiments.

FIG. 3 is a block diagram 300 of a system for re-directing a domain name query 310 to a corporate DNS server 301-1 or a local DNS server 301-2, according to some embodiments. Block diagram 300 illustrates an efficient DNS address resolution by splitting a corporate/intranet DNS traffic 332 from a general/internet traffic 334. The traffic split is directed separately to a corporate DNS server 301-1 which will handle corporate queries, and to a local ISP-issued DNS server 301-2 for non-corporate queries. In some embodiments, the efficiency of a system as illustrated in block diagram 300 may increase over 80%, compared with a system that uses a single DNS server (e.g., corporate DNS server 301-1, alone).

A controller 302 (e.g., BoCs 102 or 202) is configured to parse the query content for specific text strings. In some embodiments, a corporate text string 322 may include the name/codename of the core hosting core DNS 301-1, e.g., "*.enterprise.*" where the "*" character stands for any text string. In some embodiments, a public text string 324 may include the name/codename of a public host server, e.g., "*.public_domain.*" A packet-capture protocol may be used to determine that a query 310 suffixed with corporate text string 322 be redirected to corporate DNS server 301-1. Corporate text string 322 may be associated with DNS packets having an IP address of corporate DNS server 301-1 as a destination IP address.

More generally, controller 302 includes a mechanism to differentiate between core traffic 332 and general traffic 334 when a query 310 is generated. In some embodiments, a network administrator configures controller 302 via a CLI tool to select the domains for whom the traffic has to be redirected to a dedicated DNS server (e.g., CLI tool 242).

Some advantages of the system illustrated in block diagram 300 include the reduced deployment of unnecessary hardware and related infrastructure, thus reducing investment costs. Widening the gap for core traffic 332 and general traffic 334, the system in block diagram 300 offers greater speed of response and assured reliability, as the reduced core traffic 332 may be further encrypted along the pipeline. This promises security for corporate resolution queries.

In some embodiments, local DNS server 301-2 is used as primary DNS, and corporate DNS is configured as a Redirect-DNS. Thus, for configured corporate domains, resolution queries 310 will be redirected to the designated server instead of attempting to resolve at local DNS server 301-2.

Figure 4:
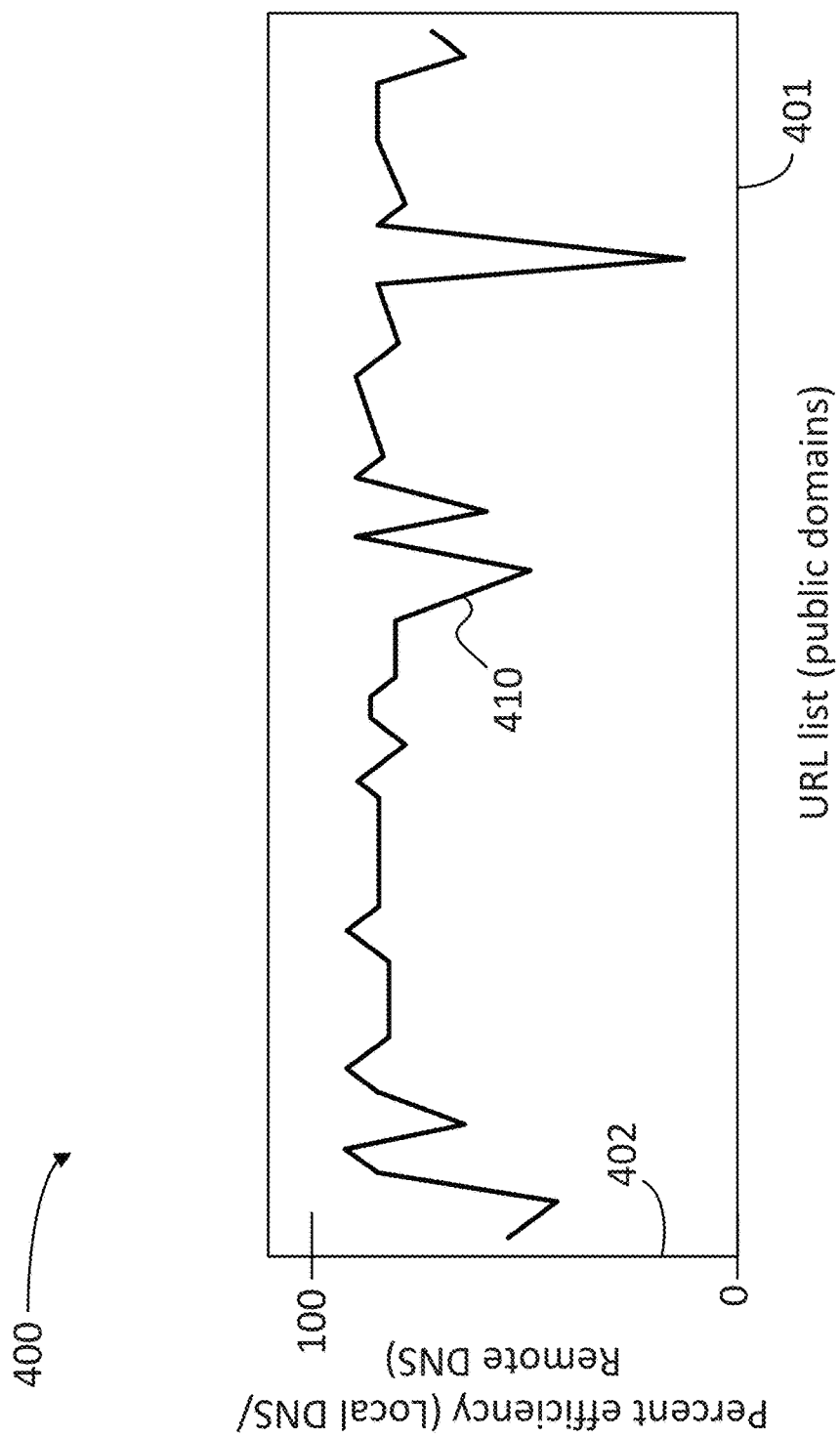
FIG. 4 is chart indicating a percentage efficiency gain for using a local DNS server over a remote DNS server for multiple, public universal resource locator (URL) addresses, according to some embodiments.

FIG. 4 is chart 400 indicating a percentage efficiency gain 402 for domain name resolution using a local DNS server over a remote DNS server for multiple, public universal resource locator (URL) addresses 401, according to some embodiments. While a curve 410 shows variability in efficiency gain across the multiple URLs 401, efficiency increase across the board is greater than 10%, and in many instances is 80%, or more.

Percentage efficiency gain 402 may be determined with a Round-Trip-Time (RTT) for URL resolution for queries presented by client devices in the network (e.g., client devices 110 and 210). Accordingly, in some embodiments the RTT is noticeably smaller when a public domain name resolution is performed at the local DNS server provided by the ISP, compared to sending the query to the corporate DNS server, which can be across the continents.

Figure 5:
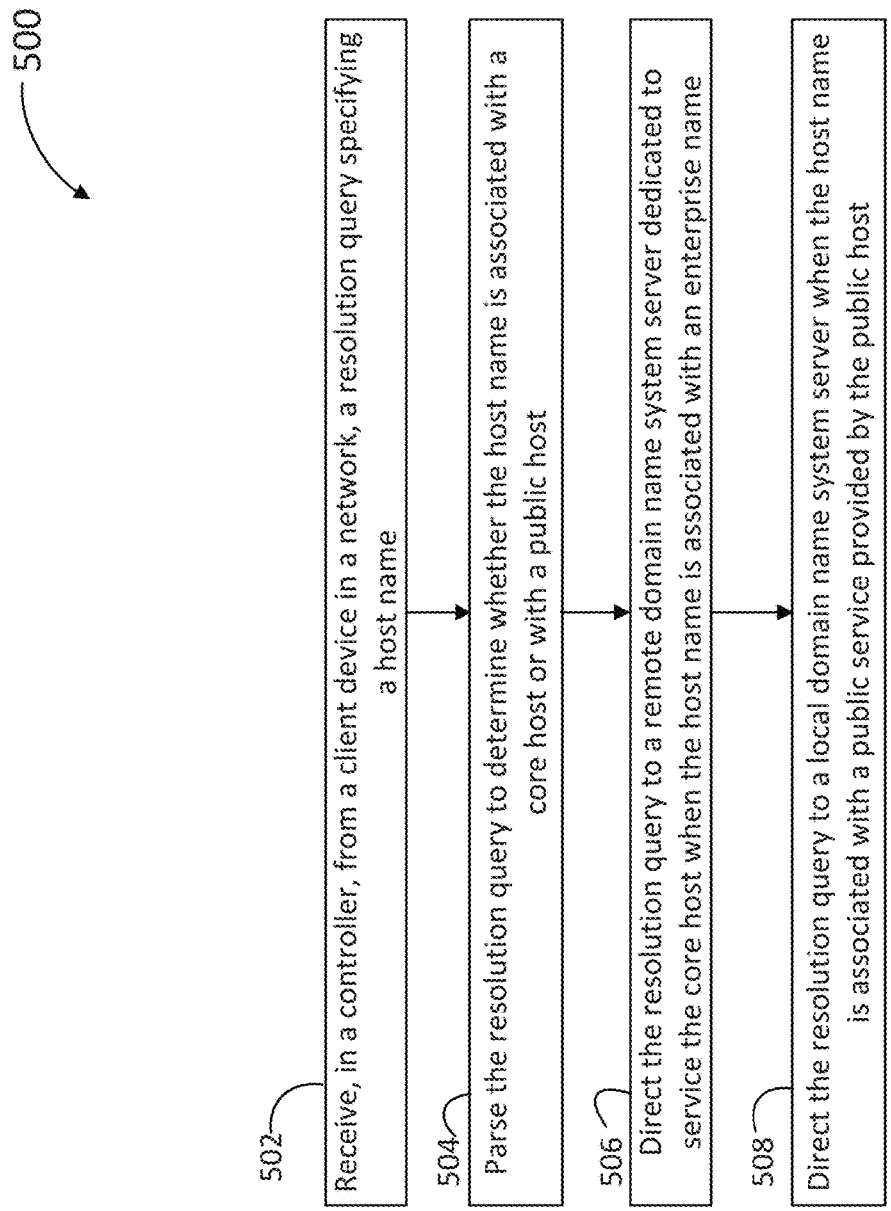
FIG. 5 is a flow chart illustrating steps in a method for re-directing a DNS traffic to multiple DNS servers, according to some embodiments.

FIG. 5 is a flow chart illustrating steps in a method 500 for re-directing a DNS traffic to multiple DNS servers, according to some embodiments. Method 500 may be performed at least partially by any one of a server or a network device while communicating with a client device (e.g., any one of corporate DNS servers 131 or 231, local DNS servers 100 or 200, router 151, BoCs 102 or 202, master controller 132, and client devices 110 or 210). The server may be hosting a network analysis engine configured to perform statistics and other diagnostics on the network traffic, or configuring a controller in the network (e.g., network analysis tool 246, DNSMASQ tool 244, configuration tool 248, or CLI tool 242). The client device may be handled by a user, wherein the user may be a client of a network (e.g., network 150). At least some of the steps in method 500 may be performed by a computer having a processor executing commands stored in a memory of the computer (e.g., processors 212 and memories 232). Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes receiving, in a controller, from a client device in a network, a resolution query specifying a host name. In some embodiments, step 502 includes connecting the controller in the branch office, and providing internet connectivity. Further, step 502 may include detecting the master controller in the corporate server, and downloading configurations to provide the services therein, without mandating any touch points.

Step 504 includes parsing the resolution query to determine whether the host name is associated with a core host or with a public host. In some embodiments, step 504 includes searching, within the resolution query, for a character string comprising an enterprise name. In some embodiments, step 504 includes searching, within the resolution query, for a character string comprising a public domain.

Step 506 includes directing the resolution query to a remote domain name system server dedicated to service the core host when the host name is associated with an enterprise name. In some embodiments, step 506 includes encrypting the resolution query through a firewall.

Step 508 includes directing the resolution query to a local domain name system server when the host name is associated with a public service provided by the public host. In some embodiments, step 508 includes downloading a configuration for the local domain name system server from the remote domain name system server. In some embodiments, step 508 includes receiving a user configuration of the local domain name system server via a command line interface. In some embodiments, step 508 includes dynamically updating a list of public host servers for parsing the resolution query. In some embodiments, step 508 includes dynamically updating a list of core host servers for parsing the resolution query. In some embodiments, step 508 includes determining a round-trip-time for the resolution query when the host name is associated with a public domain service request and directing the resolution query to a second local domain name system server when the round-trip-time exceeds a pre-selected threshold. In some embodiments, step 508 also includes verifying that a resolution query comprising an enterprise domain is redirected to the core host.

Figure 6:
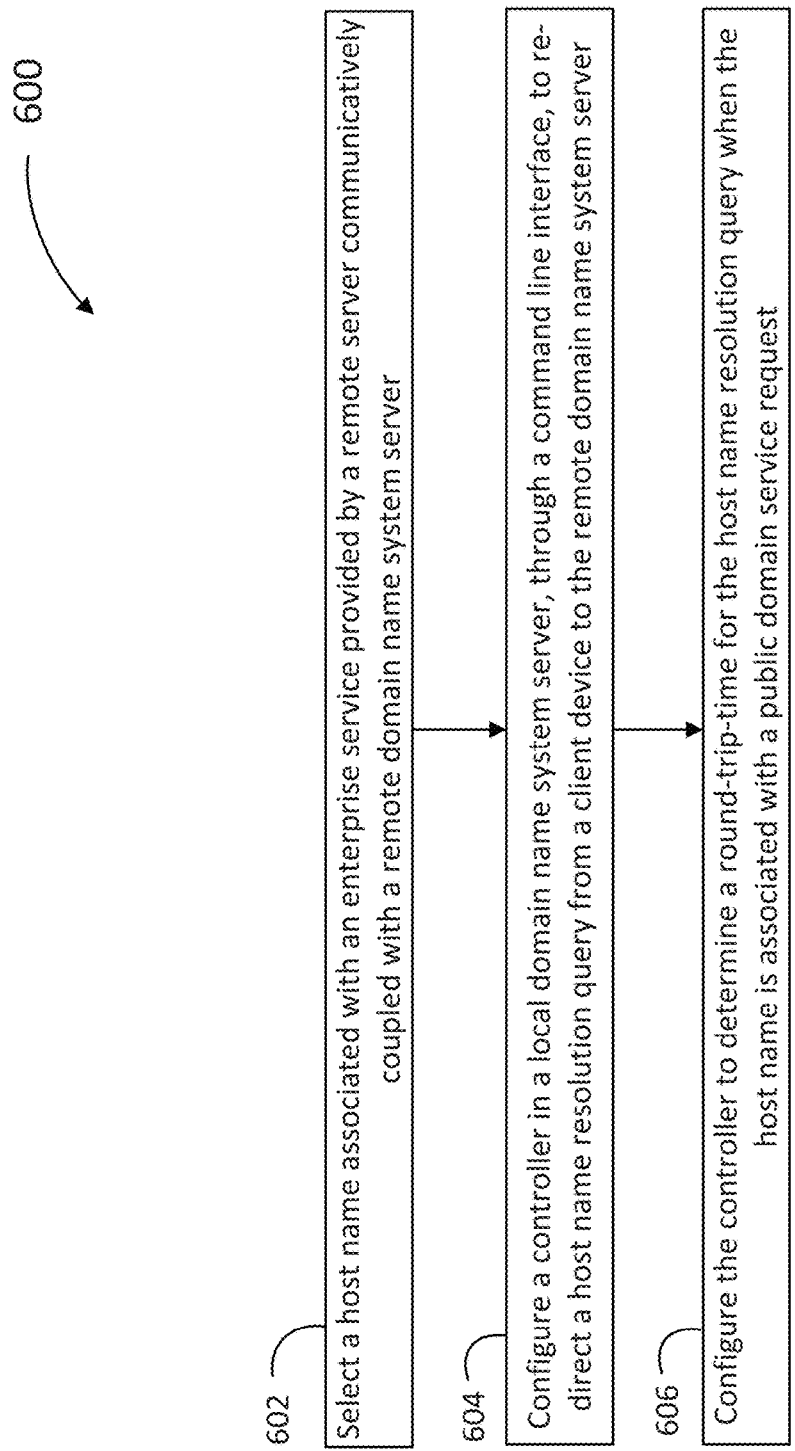
FIG. 6 is a flow chart illustrating steps in a method for configuring a network controller for redirecting DNS traffic, according to some embodiments.

FIG. 6 is a flow chart illustrating steps in a method for configuring a network controller for redirecting DNS traffic, according to some embodiments. Method 600 may be performed at least partially by any one of a server or a network device while communicating with a client device (e.g., any one of corporate DNS servers 131 or 231, local DNS servers 100 or 200, router 151, BoCs 102 or 202, master controller 132, and client devices 110 or 210). The server may be hosting a network analysis engine configured to perform statistics and other diagnostics on the network traffic, or configuring a controller in the network (e.g., network analysis tool 246, DNSMASQ tool 244, configuration tool 248, or CLI tool 242). The client device may be handled by a user, wherein the user may be a client of a network (e.g., network 150). At least some of the steps in method 600 may be performed by a computer having a processor executing commands stored in a memory of the computer (e.g., processors 212 and memories 232). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes selecting a host name associated with an enterprise service provided by a remote server communicatively coupled with a remote DNS server (e.g., the corporate DNS server). In some embodiments, step 602 includes receiving an updated list of core host servers for parsing the resolution query.

Step 604 includes configuring the controller in the local domain name server, through a CLI, to re-direct a host name resolution query from a client device to the remote domain name system server.

In some embodiments, step 604 includes typing in a command in the CLI, such as follows:

(SP-VMC-117)[mynode](config)#ip domain-redirect corp.hpe.com 10.1.2.3      (1)

The configuration in command line (1) may be inherited from the master controller, along with the general purpose DNS server as part of the BoC configuration.

In some embodiments, step 604 includes configuring the controller using the DNSMARQ tool to generate the dnsmasq config file, as in /tmp #cat/etc/dnsmasq.conf address=/corp.hpe.com/10.1.2.3      (2)

Generally, (e.g., on a Linux-based system), DNS information is available in a "resolv.conf" file (assuming the ISP-issued DNS server is 192.168.10.1), with a path as follows:

/tmp #cat/etc/resolv.conf nameserver=192.168.10.1      (3)

The entry (2) in dnsmasq specifies that for any hostname with suffix "corp.hpe.com" resolution query will be sent to 10.1.2.3 instead of 192.168.10.1 (3). Accordingly, in some embodiments step 604 includes redirecting any query with aforementioned suffix to another server which will be on the corporate intranet. In some embodiments, step 604 may include configuring the controller to redirect DNS requests based on the type of query (e.g., public/general vs. corporate/private).

Step 606 includes configuring the controller to determine a round-trip-time (RTT) for the host name resolution query when the host name is associated with a public domain service request. In some embodiments, step 606 includes selecting a host name from an updated list of public host servers and allow the host name resolution query to reach a public host having the host name. In some embodiments, step 606 includes testing packet metrics (e.g., using network analysis tool 246) with source tools such as NSLOOKUP and DIG, and verifying that an increase in efficiency is observed (e.g., of up to 80%, compared to use of a single, remote DNS server).

In some embodiments, step 606 may include supporting further layers in the network architecture with a "Redirect-DNS" scheme as described above. Further, in some embodiments step 606 may include caching the activity of the controller in the local DNS server for enabling a fast access in future query requests.

Hardware Overview

Figure 7:
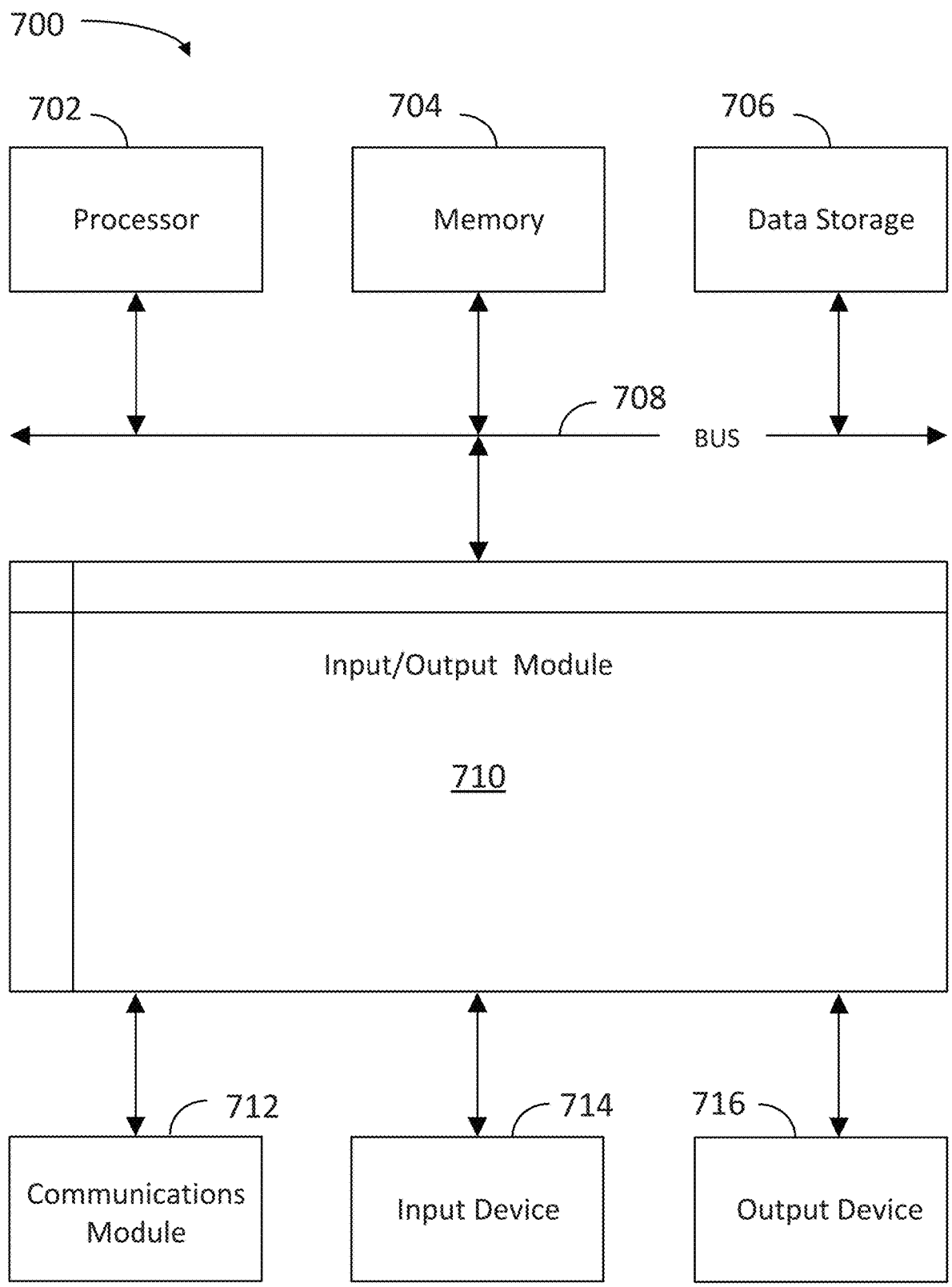
FIG. 7 is a block diagram illustrating an example computer system with which the client and network device of FIG. 1 and the methods of FIGS. 2-4 can be implemented.

FIG. 7 is a block diagram illustrating an exemplary computer system 700 with which the client device 110 and core DNS server 233 of FIG. 1, and the methods of FIGS. 2-4, can be implemented. In certain aspects, the computer system 700 may be implemented using hardware or a combination of software and hardware, either in a dedicated network device, or integrated into another entity, or distributed across multiple entities.

Computer system 700 (e.g., client device 110 and core DNS server 233) includes a bus 708 or other communication mechanism for communicating information, and a processor 702 (e.g., processors 212) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memories 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

A computer program as discussed herein does not necessarily correspond to a file in a file system. A program can be stored in a portion of a file that holds other programs or data (e.g., one or more scripts stored in a markup document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 (e.g., communications modules 208) include networking interface cards, such as Ethernet cards and modems. In certain aspects, input/output module 710 is configured to connect to a plurality of devices, such as an input device 714 (e.g., input device 114) and/or an output device 716 (e.g., output device 116). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, client device 110, BoCs 102 and 202, local DNS servers 100 and 200, and corporate DNS servers 131 and 231 can be implemented using a computer system 700 in response to processor 702 executing one or more sequences of one or more instructions contained in memory 704. Such instructions may be read into memory 704 from another machine-readable medium, such as data storage 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a branch office, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and network devices. A client and network device are generally remote from each other and typically interact through a communication network. The relationship of client and network device arises by virtue of computer programs running on the respective computers and having a client-network device relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage 706. Volatile media include dynamic memory, such as memory 704. Transmission media include coaxial cables, copper wire, and fiber optics, including the wires forming bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 212, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:

selecting a host name associated with an enterprise service provided by a remote server communicatively coupled with a remote domain name system server, wherein selecting the host name associated with the enterprise service comprises selecting the host name from an updated list of core host servers;

configuring a controller in a local domain name server, through a command line interface, to re-direct host name resolution queries associated with the host name to the remote domain name system server to be resolved by the remote domain name system server instead of the local domain name server, wherein configuring the controller in the local domain name server comprises generating a configuration file containing configuration information specified through the command line interface, the configuration file specifying a suffix of the host name and further specifying that any host name resolution query that includes the suffix be redirected to an Internet Protocol (IP) address associated with the remote domain name system server;
receiving, by the controller, a first host name resolution query from a first client device;
determining, by the controller, that the first host name resolution query is associated with the host name, wherein determining that the first host name resolution query is associated with the host name comprises determining that the first name resolution query includes domain name service (DNS) information that matches the configuration information; and
redirecting, by the controller, the first host name resolution query to the remote domain name system server.

2. The computer-implemented method of claim 1, further comprising:
receiving, by the controller, a second host name resolution query from a second client device;
determining, by the controller, that the second host name resolution query is associated with a public domain service request; and
configuring, based at least in part on the second host name resolution query being associated with the public domain service request, the controller to determine a round-trip-time for resolving the second host name resolution query.

3. The computer-implemented method of claim 2, wherein the host name is a first host name, the method further comprising selecting a second host name from an updated list of public host servers and allowing the second host name resolution query to reach a public host having the second host name.

4. The computer-implemented method of claim 1, wherein configuring the controller in the local domain name server comprises providing the configuration information as an input command to the command line interface.

5. The computer-implemented method of claim 4, wherein the input command comprises a configuration inherited from a master controller.

6. The computer-implemented method of claim 2, further comprising:
testing, by the controller, data packets associated with resolving the second host name resolution query; and
verifying, by the controller, that an efficiency increase is observed by the local domain name server resolving the second host name resolution query instead of the remote domain name system server.

7. The computer-implemented method of claim 1, wherein verifying that the efficiency increase is observed comprises determining that at least a threshold percentage efficiency increase is observed.

* * * * *